United States Patent Office 3,589,945
Patented June 29, 1971

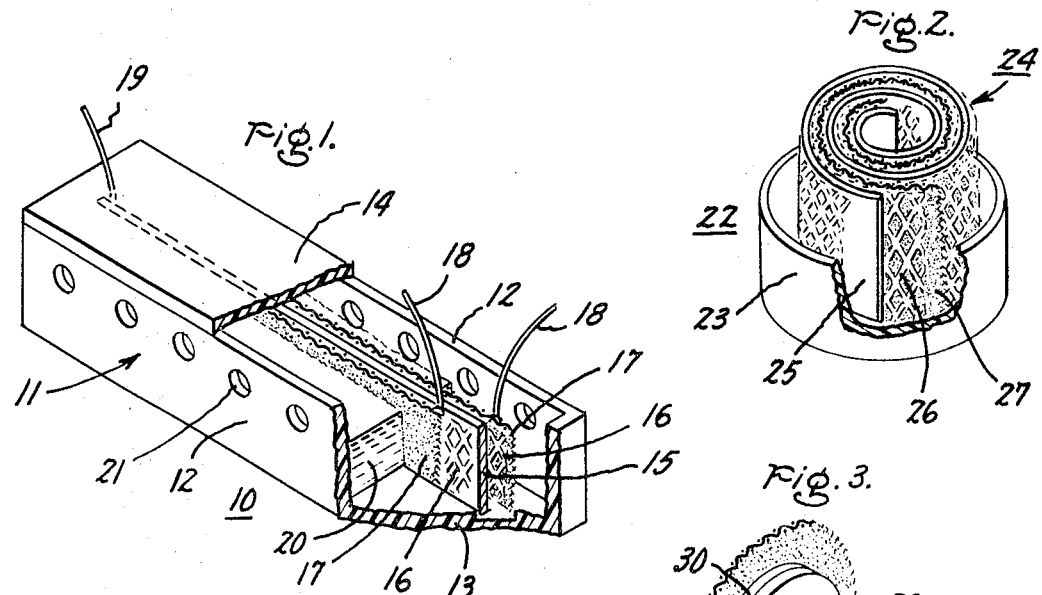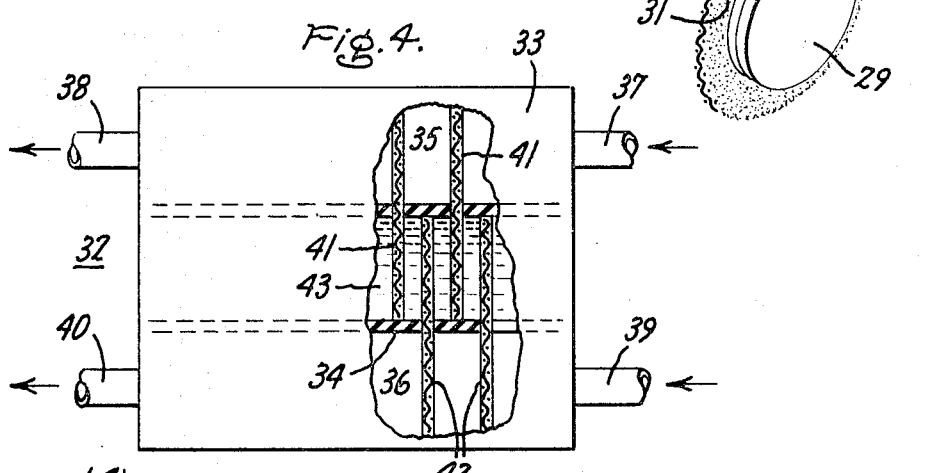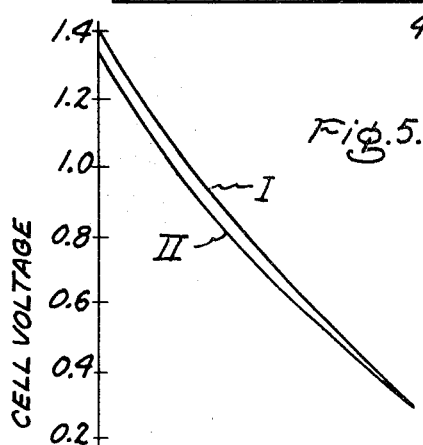

3,589,945
STACKED METAL GAS-CELLS
Harold A. Christopher, Scotia, and Paul J. Moran, Ballston Lake, N.Y., assignors to General Electric Company
Original application Oct. 30, 1967, Ser. No. 679,147. Divided and this application Aug. 21, 1969, Ser. No. 851,856
Int. Cl. H01m 29/04
U.S. Cl. 136—86                                      1 Claim

ABSTRACT OF THE DISCLOSURE

An electrochemical cell has a first electrode and a second electrode, an aqueous electrolyte positioned between and in contact with the electrodes, and at least one of the electrodes is a gas diffusion electrode immersed partially in the electrolyte and the remaining portion of the electrode exposed to a gaseous medium. A modified electrochemical cell has a casing with an aqueous electrolyte therein, a first electrode in contact with the electrolyte, a second electrode in contact with the electrolyte and spaced from the first electrode, and at least one of the electrodes is a gas diffusion electrode immersed partially in the electrolyte and the remaining portion of the electrode exposed to a gaseous medium. For example, such cells are operated as metal-air cells, metal-fuel cells, and fuel cells.

---

This application is a division of our copending application, Ser. No. 679,147, filed Oct. 30, 1967, which is assigned to the same assignee as the present application.

This invention relates to electrochemical cells and, more particularly, to such cells in which one or both the electrodes are gas diffusion electrodes which are immersed partially in the electrolyte and the remaining portion of the electrodes contacts a gaseous medium.

A metal-air cell is a galvanic cell which uses an oxidant of oxygen or oxygen from the air as the reactive material consumed at the positive electrode. The oxygen thereby serves as a cathode depolarizer. Various types of gas diffusion cathodes through which oxygen can be diffused can be employed. These include, for example, carbon electrodes, pasted electrodes of a metal catalyst bonded by polytetrafluoroethylene on a metal screen, and catalytically active carbon particles bonded together and to a grid by a hydrophobic binder. The anode in such a cell is produced from various materials, such as magnesium, lead, zinc and aluminum which are known in the prior art as consumable metals. A rechargeable cell can be provided when lead, zinc, iron or cadmium is used as the anode. An aqueous electrolyte contacts both electrodes which are spaced apart. In such a cell with a gas diffusion cathode, various problems are encountered including weepage, electrolyte evaporation, and loss of performance.

Another cell employs a fuel such as hydrogen which is supplied to a gas diffusion electrode functioning as the anode. The cathode employs a material such as lead dioxide. An aqueous electrolyte is in contact with both electrodes which are spaced apart. In the operation of the cell, the lead dioxide is reduced to lead. Such a cell can also be recharged.

A fuel cell comprises generally a pair of electrodes separated by an electrolyte. A fuel, such as hydrogen, is supplied to one electrode where it reacts and releases electrons. These electrons flow through an external circuit connection to the cathode or positive electrode and there serve to reduce oxygen from air or from pure oxygen gas. The electrical circuit is completed through the fuel cell by ionic conduction through the electrolyte. In a fuel cell battery, which consists frequently of a plurality of individual cells, it is necessary to provide a complex system of channels to supply both the hydrogen and oxygen gases to the respective electrodes.

The gas diffusion electrodes of either the metal-fuel cell or the gaseous fuel cell are also subjected to the above problems encountered in the metal-air cell.

Our present invention is directed to improved electrochemical cells which can be employed, for example, as metal-air cells, metal-fuel cells or fuel cells. In the cells of our invention, either or both electrodes are gas diffusion electrodes which are immersed partially in the electrolyte and the remaining portion of the electrode is exposed to a gaseous medium providing a simple, rugged device thereby overcoming the above problems. With the present construction, a wide variety of gas diffusion electrodes are employable.

It is a primary object of our invention to provide an improved electrochemical cell wherein a variety of gas diffusion electrodes can be employed.

It is another object of our invention to provide such an improved electrochemical cell which will provide a power density similar to a conventional electrochemical cell and will operate for a longer period of time.

It is a further object of our invention to provide such an improved electrochemical cell which can function as a metal-air cell, a metal-fuel cell or a fuel cell.

In accordance with one aspect of our invention an electrochemical cell has a first electrode, a second electrode, an aqueous electrolyte positioned between and in contact with the electrodes, and at least one of the electrodes is a gas diffusion electrode immersed partially in the electrolyte and the remaining portion of the electrode exposed to a gaseous medium.

These and various other objects, features, and advantages of the invention will be better understood from the following description taken in connection with the accompanying drawing in which:

FIG. 1 is a perspective view, partially in section, of an electrochemical cell embodying our invention;

FIG. 2 is a perspective view, partially in section, of a modified electrochemical cell;

FIG. 3 is a perspective view of a further modified electrochemical cell;

FIG. 4 is a side elevational view, partially in section, of a fuel cell embodying our invention; and FIG. 5 is a graph plotting metal-air cell performance in current density versus cell voltage.

In FIG. 1 of the drawing there is shown generally at 10 an electrochemical cell embodying our invention, which cell is employed as a metal-air cell. Cell 10 has a casing or container 11 with sidewalls 12 and a bottom wall 13. A cover 14 is provided for casing 11. A first electrode 15 in the form of a magnesium anode is positioned within the casing 11 in any suitable manner such as by fitting in a recess in the bottom wall 13. An electrically insulating, porous separator 16 is positioned on each side of anode 15. A second electrode 17 in the form of a gas diffusion cathode is positioned on each side of separator 16. An electrical lead 18 is connected to each cathode 17, while a lead 19 is shown connected to anode 15. Within casing 11, there is provided a suitable electrolyte 20 such as an aqueous salt or alkaline solution.

While such a metal-air cell will operate with a single anode 15, separator 16, and a single cathode 17, it is more desirable to employ a pair of cathodes 17 since anode 15 has two opposed, useable surfaces. In FIG. 1 of the drawing, a pair of separators 16 are employed to space cathode 17 from anode 15. While there is a desirable arrangement, it will be understood that cathode 17 may be merely spaced apart from anode 15 and function efficiently. While a single anode and a pair of cathodes are shown, a plurality of such anodes and cathodes may be employed within a casing 11 thereby forming a battery.

Both anode 15 and cathodes 17 are shown immersed partially in electrolyte 20 and spaced apart. However, our improved cell requires that only the gas diffusion electrodes, the cathodes, be immersed partially in the electrolyte. Such partial immersion includes contacting the cathodes with a small amount of electrolyte to almost total submersion of the cathode. There must be a surface area of each of the cathodes exposed to the gaseous medium of oxygen, which is above the electrolyte, so that oxygen can diffuse through the edge of the cathodes.

We discovered unexpectedly that we could obtain a practical power density from an electrochemical cell which includes a casing, an aqueous electrolyte within the casing, a first electrode in contact with the electrolyte, a second electrode in contact with the electrolyte and spaced from the first electrode, and at least one of the electrodes being a gas diffusion electrode immersed partially in the electrolyte and the remaining portion of the electrode exposed to a gaseous medium. In the above description of a metal-air cell, the gas diffusion electrodes are the cathodes, and the gaseous medium is oxygen which is supplied by the atmosphere.

We prefer to employ a casing which is electrically insulating. The casing is provided with a plurality of small openings 21 in the upper sidewall casing which openings are designed to admit oxygen from the ambient atmosphere and to prevent accidental loss of electrolyte.

The gas diffusion electrodes can be of a wide variety of materials. Various porous materials, which provide for diffusion of gases, can be employed in the cell. Thus the gas diffusion electrodes can be merely porous carbon blocks or slabs which may or may not be treated to improve water repellency.

However, if it is desired, pasted electrodes may be employed. These include, for example, a metal catalyst bonded by polytetrafluoroethylene on a metal screen or catalytically active carbon particles bonded together and to a screen by a hydrophobic binder. Such electrodes are disclosed and claimed in U.S. Letters Pat. 3,432,355 issued Mar. 11, 1969, and in copending application Ser. No. 664,366, filed Aug. 30, 1967, in the name of Paul J. Moran and Harold A. Christopher. The disclosures of both this patent and this application are hereby incorporated by reference.

The first electrode, which is described above as the anode in the metal-air cell, may include conventional anode materials of aluminum, magnesium, lead, zinc, or their alloys. Suitable electrolytes include sodium chloride, potassium chloride, magnesium sulfate, potassium hydroxide, etc.

We found that we could avoid electrolyte weepage, electrolyte evaporation and loss of performance problems associated with gas diffusion electrodes in electrochemical cells by immersing partially the gas diffusion electrode in the electrolyte and by exposing the remaining portion of the electrode to a gaseous medium, such as the oxygen in the air atmosphere. Thus, the electrodes are contained within a generally leakproof casing thereby providing a rugged, simple and easily assembled device. Leads are attached to the anode and cathode and extend through the casing wall to provide a convenient connection to an electrical load.

In the operation of the cell shown in FIG. 1 of the drawing, a pair of gas diffusion cathodes 17 are employed with a magnesium anode 15 and separated therefrom by a pair of separators 16. Such separators can include a wide variety of materials which are porous but are inert to both the electrolyte and the chemical reaction during operation of the cell. For example, separators of polyethylene or polypropylene mesh are very satisfactory. A lead 18 is attached to each of the cathodes and a lead 19 is attached to anode 15. The electrodes with the separators therebetween are positioned in a casing 11 and the leads extended through the walls of the casing for connection to an electrical load such as an electric lamp.

The electrodes are positioned within the casing in any suitable manner such as by pressing them into a recess in the interior bottom wall 13 of casing 11 or by employing a pair of electrically insulating supports which are on either side of the electrodes. A suitable electrolyte such as sodium chloride in an aqueous solution is poured into the casing so that both cathodes 17 and anode 16 are in contact with the electrolyte 20. The cathodes must be immersed only partially in the electrolyte so that a portion of each cathode is exposed to the air atmosphere above the electrolyte. As soon as the electrolyte is added to the casing, an electric current may be withdrawn from the cell and may be dissipated, for example, by the electric lamp.

In the above operation, a single anode and a pair of cathodes have been described. However, it will be appreciated that a plurality of anodes and cathodes separated from one another and connected in series or in parallel can be employed in the same manner.

The above described metal-air cell can be modified to operate as a metal-fuel cell. Such a cell employs a gas diffusion electrode of the above described type as the anode. The other electrode is of a material suitable for reduction, such as lead dioxide. The same type of electrolyte can be employed. The anode is immersed partially in the electrolyte and the remaining portion of the anode exposed to a gaseous medium, such as hydrogen, which is supplied from a suitable source. In the operation of the cell, the lead dioxide is reduced to lead. This cell is rechargeable. The above-mentioned metal-air cell or metal-fuel cell can be modified further to operate as a fuel cell. Such a cell employs a pair of gas diffusion electrodes of the above described type which are partially immersed in a similar electrolyte and partially exposed to different gaseous mediums. One electrode is exposed to a gaseous medium of oxygen from a suitable source such as the air, while the other electrode is exposed to a gaseous medium such as hydrogen. In such an arrangement it will be necessary to provide a barrier so that the two gases do not mix, but are supplied separately to the electrodes.

In FIG. 2 of the drawing there is shown a modified cell or battery 22. This cell has an electrically insulating casing 23 which is shown in a circular configuration. Within the casing is provided a spiral configuration 24 which consists of a first electrode 25 in strip form, a chemically inert, porous spacer 26 in strip form adjacent electrode 25, and a gas diffusion electrode 27 adjacent spacer 26. These strips have been wound together to form the spiral configuration. A lead (not shown) is attached to each of the electrodes and extends outward from the casing. If casing 23 is not electrically insulating, a layer of electrical insulation is positioned between casing 23 and spiral configuration 24. If desired to make the cell generally leakproof, a cover (not shown) is placed on the top of casing 23. A plurality of small openings are then provided in the cover or in the upper wall of the casing to provide the gaseous medium of air containing oxygen for operation of the cell. The above openings are designed to prevent accidental loss of electrolyte.

In the operation of this cell, an electrolyte 20 is poured into casing 23 to a level whereby both first electrode 25 as the anode and gas diffusion electrode 27 as the cathode are in contact with the electrolyte, and the cathode is immersed only partially therein and exposed partially to the gaseous medium of air containing oxygen. While the preferred manner of spacing anode 25 and cathode 27 is by providing a porous separator, it is possible to position both the anode and cathode within such a casing without the separator by appropriate construction. As soon as the electrolyte has been added to the casing, an electric current may be withdrawn from the cell and may be dissipated, for example, by an electric bulb. In this configuration, the various problems associated with a cell employing a conventional gas diffusion cathode such as weepage, electrolyte evaporation, and loss of performance are overcome.

The above described metal-air cell can be modified to operate as a metal-fuel cell or as a fuel cell in the same manner as described above for the modification of the metal-air cell in FIG. 1 of the drawing. When such a cell operates as a metal-fuel cell, the anode is a gas diffusion electrode which is immersed partially in the electrolyte and exposed partially to a gaseous medium such as hydrogen. The cathode is an electrode such as lead dioxide which is electrochemically reduced by the hydrogen fuel supplied to the cell. When the cell operates as a fuel cell, both the anode and cathode are gas diffusion electrodes which are partially immersed in the electrolyte and partially exposed to gaseous mediums. One gaseous medium which contains oxygen is in contact with a portion of one of the electrodes, while a second gaseous medium such as hydrogen is in contact with the other electrode. These gaseous mediums are prevented by suitable means from contacting one another.

In FIG. 3 of the drawing, there is shown a further modified electrochemical cell 28 in which a casing, which would normally be employed with such a cell, has been eliminated. Cell 28 has a first electrode 29, a chemically inert, porous matrix 30 containing an aqueous electrolyte and a second electrode 31 which has a gas diffusion structure. Matrix 30 is positioned between and in contact with both electrodes 29 and 31. Gas diffusion electrode 31 is of a greater diameter than matrix 30 thereby extending beyond the periphery of the cell. A portion of electrode 31 is in contact with matrix 30 containing the electrolyte whereby electrode 31 is immersed partially in the electrolyte and exposed partially to a gaseous medium such as the air atmosphere containing oxygen. In FIG. 3 of the drawing, electrode 29 is shown as the anode of the cell, while electrode 31 is shown as the cathode of the cell. As in the previous cells shown in FIGS. 1 and 2 of the drawing, an electrical lead (not shown) is in contact with each of the electrodes to provide an electrical connection to a load (not shown).

This cell operates in the same manner as the metal-air cell shown in FIGS. 1 and 2 of the drawing. However, a simple and easily assembled cell is provided which does not require a casing or the employment of a free electrolyte.

Electrodes 29 and 31 are formed of the same type of materials as in the previous figures of the drawing. The same type of electrolyte is impregnated into matrix 30, which matrix may be of a wide variety of materials which are chemically inert and porous, whereby the electrolyte is retained therein. Such materials as paper, cloth and porous plastics may be employed for such matrix.

The above-described metal-air cell can be modified to provide a metal-fuel cell or fuel cell in the same manner as the fuel cells in FIGS. 1 and 2 were modified. Additionally, a battery may be constructed by stacking a plurality of the cells shown in FIG. 3. When the cells are stacked, the gas diffusion electrode or cathode of one cell or unit of the battery is in electrical contact with an adjacent anode of the next unit of the battery. The individual cells are therefore connected together electrically in series arrangement to furnish a high voltage battery. If desired, the individual cells may be held together in any suitable manner, such as by clamps. Matrix 30 can also be replaced by a chemically inert ring with free electrolyte contained within the ring.

Additionally, the cell of FIG. 3 may be modified by providing the anode, the matrix, and the gas diffusion electrode in the strip form. These strips are then wound in a spiral configuration to provide a modified electrochemical cell which does not need a casing to surround it.

In FIG. 4 of the drawing, there is shown a fuel cell 32 which comprises an outer casing 33 and an inner casing 34 therein. An upper portion 35 of casing 33 is sealed off from a bottom portion 36 of the casing. In this manner, an oxygen chamber is provided by upper portion 35, which chamber has an inlet 37 and an outlet 38. Oxygen may be provided from an oxygen source or derived from air which is fed to this chamber. The bottom portion 36 of casing 33 provides a hydrogen chamber with an inlet 39 and an outlet 40. Hydrogen may be provided from any suitable source. If desired, other fuel gases may be fed through inlet 39.

Casing 34 contains a plurality of gas diffusion cathodes 41 and anodes 42 which are spaced apart when fitted into casing 34. If desired, chemically inert, porous spacers or matrices can be employed. One edge of each cathode 41 extends into the upper portion 35 of casing 33 thereby being in contact with the gaseous medium of oxygen provided to the oxygen chamber. In a similar manner, one edge of each anode 42 extends into the hydrogen chamber or fuel chamber thereby being in contact with the gaseous medium therein. An aqueous electrolyte 43 fills casing 34 whereby both the anodes and cathodes are immersed partially in the electrolyte and exposed partially to their respective gaseous mediums. As in various types of fuel cells, various types of electrolytes and fuels may be employed in our invention.

In the operation of the device shown in FIG. 4 of the drawing, a plurality of cathodes 41 and anodes 42 are assembled in casing 34. The individual cells are connected electrically in series. Casing 34 is then filled with a suitable electrolyte, such as, for example, potassium hydroxide. As with the cathode shown in FIGS. 1, 2 and 3 of the drawing, a wide variety of structures may be employed. In FIG. 4 of the drawing, the anode structure is a gas diffusion electrode which may be identical with the cathode structure. A suitable oxidant such as oxygen is fed through inlet 37 and into contact with cathodes 41. An outlet 38 is provided for gaseous products. In a similar manner, hydrogen or another suitable fuel is fed through inlet 39 into the bottom portion 36 into contact with anodes 42. A gaseous outlet 40 is provided. In this manner, device 32 operates as a fuel cell. With the present arrangement of the anodes and cathodes partially immersed in electrolyte 43 in casing 34, many of the problems associated with gas diffusion electrodes are eliminated.

Examples of electrochemical cells made in accordance with our invention are set forth below:

EXAMPLE 1

Electronically conductive, catalytically active carbon particles were formed from wood and treated subsequently with heat and steam. The carbon was washed with strong mineral acid and then with water to remove extractable inorganic constituents. A solution of 10 weight percent polyvinyl fluoride (PVF) in N,N-dimethylacetamide (DMA) was prepared. The above carbon particles were added to the solution whereby the PVF was 15 weight percent of the carbon. Excess DMA was added to adjust consistency. The slurry was then applied to a nickel screen by brushing, after which solvent was evaporated by air drying at a temperature of less than 50° C. for 24 hours thereby providing a gas diffusion electrode.

Two strips which were 0.5 inch x about 4.0 inches were cut from the above electrode to form two gas diffusion cathodes of the configuration shown in FIG. 1 of the drawing. A magnesium strip was used as the anode, while polyethylene mesh separators were employed between the cathodes and the anode. This cell employed an aqueous solution of 7 weight percent sodium chloride. In accordance with our invention, an amount of electrolyte was provided in the casing which immersed partially the cathodes to a height of 0.25 inch. The remaining area of the cathodes was exposed to a gaseous medium of air. Since the anode was of a similar size to the cathode, it was also partially immersed. The performance of the cell under these conditions is shown by curve I in FIG. 5. The cell was operated again in which the electrolyte was raised to cover two-thirds the total area of the cathode. The performance of the cell under these conditions was identical to the previous performance.

EXAMPLE 2

Another metal-air cell was assembled employing the electrode structure as set forth in Example 1 and provided with an anode of zinc sheet and an aqueous solution of 31 weight percent potassium hydroxide. The electrolyte was added initially to immerse the cathodes to one-half of their total area. The performance of the cell under these conditions is shown by curve II in FIG. 5 of the drawing. The cathodes were then immersed to two-thirds of their total area. The performance of the cell under these conditions was identical with the previous performance.

While other modifications of the invention and variations thereof which may be employed within the scope of the invention have not been described, the invention is intended to include such as may be embraced within the following claim.

What we claim as new and desire to secure by Letters Patent of the United States is:

1. In a battery comprising a plurality of stacked metal gas cells, each cell comprising a first electrode, a second consumable metal electrode, and an aqueous electrolyte positioned between and in contact with the electrodes, the improvement wherein the first electrode of each cell is a gas diffusion electrode contacting the electrolyte and the remaining portion of the first electrode extends beyond the periphery of the cell to thereby expose said remaining portion of the electrode to the gas.

References Cited

UNITED STATES PATENTS

| 2,727,079 | 12/1955 | Chubb et al. | 136—132X |
| 2,842,607 | 7/1958 | Germershausen et al. | 139—179X |
| 2,991,324 | 7/1961 | Vogt | 136—13 |
| 3,119,722 | 1/1964 | Tietze et al. | 136—13 |
| 3,354,000 | 11/1967 | Dengler et al. | 136—86 |
| 3,364,069 | 1/1968 | Deschamps | 136—13 |
| 3,391,028 | 7/1968 | Vose | 136—86 |
| 3,475,222 | 10/1969 | Biddick | 136—86 |
| 3,484,292 | 12/1969 | Bonnemay et al. | 136—86 |

ALLEN B. CURTIS, Primary Examiner